US 7,221,152 B2

(12) United States Patent
Piippo

(10) Patent No.: US 7,221,152 B2
(45) Date of Patent: May 22, 2007

(54) METHOD IN SALIENT-POLE PERMANENT MAGNET SYNCHRONOUS MACHINE

(75) Inventor: Antti Piippo, Espoo (FI)

(73) Assignee: ABB OY, Helsinki (FI)

( * ) Notice: Subject to any disclaimer, the term of this patent is extended or adjusted under 35 U.S.C. 154(b) by 247 days.

(21) Appl. No.: 10/919,484

(22) Filed: Aug. 17, 2004

(65) Prior Publication Data

US 2005/0052177 A1 Mar. 10, 2005

(30) Foreign Application Priority Data

Sep. 5, 2003 (FI) ................................. 20031267

(51) Int. Cl.
*G01B 7/30* (2006.01)
*H01F 5/00* (2006.01)
*G01P 3/46* (2006.01)

(52) U.S. Cl. ........................... 324/207.25; 324/207.17; 324/177

(58) Field of Classification Search ........... 324/207.15, 324/207.17, 207.25, 160, 163, 166, 177; 318/727–832, 701, 720, 721
See application file for complete search history.

(56) References Cited

U.S. PATENT DOCUMENTS

| | | | |
|---|---|---|---|
| 5,565,752 | A | 10/1996 | Jansen et al. |
| 5,726,549 | A | 3/1998 | Okuno et al. |
| 5,969,496 | A | 10/1999 | Yamada et al. |
| 6,137,258 | A * | 10/2000 | Jansen ........................ 318/802 |
| 6,163,127 | A | 12/2000 | Patel et al. |
| 6,492,788 | B1 | 12/2002 | Agirman et al. |
| 7,045,988 | B2 * | 5/2006 | Ha et al. ..................... 318/807 |
| 2002/0163319 | A1 | 11/2002 | Kaneko et al. |
| 2003/0015987 | A1 | 1/2003 | Cheong et al. |
| 2003/0057912 | A1 | 3/2003 | Iwaji et al. |
| 2003/0141865 | A1 * | 7/2003 | Voillat ................... 324/207.16 |

FOREIGN PATENT DOCUMENTS

EP 1 107 446 6/2001

OTHER PUBLICATIONS

Harnefors, L., et al., A general algorithm for speed and position estimation of ac motors, IEEE Transactions on industrial electronics, vol. 47, No. 1, Feb. 2000, pp. 77-83.
Corley, M., et al., Rotor Position and velocity estimation for a salient-pole permanent magnet synchronous machine at standstill and high speeds, IEEE Transactions in industry applications, vol. 34, No. 4, Jul./Aug. 1998.
Ohtani, T. et al., Vector Control of Induction Motor Without Shaft Encoder; IEEE Transactions on Industry Applications, vol. 28, No. 1, Jan./Feb. 1992, s. 157-164.
T. Aihara, A. Toba and T. Yanase. "Sensor-less Torque Control of Salient-Pole Synchronous Motor at Zero Speed Operation," IEEE, vol. 2, pp. 715-720, Feb. 1997.

* cited by examiner

*Primary Examiner*—Edward Lefkowitz
*Assistant Examiner*—Kenneth J. Whittington
(74) *Attorney, Agent, or Firm*—Dykema Gossett PLLC

(57) ABSTRACT

A method for determining the speed and position of a rotor of a salient-pole permanent magnet synchronous machine, the method comprising the steps of creating a voltage model (41) on a permanent magnet synchronous machine, forming a voltage reference ($u_{s,ref}$) for a stator of the permanent magnet synchronous machine, determining stator currents ($i_s$) of the permanent magnet synchronous machine, calculating a rotor angular speed (42) from the voltage reference ($u_{s,ref}$) and the stator currents ($i_s$) using the voltage model (41). The method further comprises the steps of forming with signal injection a position tracking signal ($\epsilon$) of the rotor of the permanent magnet synchronous machine, forming a rotor angular speed estimate ($\hat{\omega}_m$) from the calculated rotor angular speed (42) and the rotor position tracking signal ($\epsilon$), forming a rotor position angle estimate ($\hat{\theta}_m$) from the formed rotor angular speed estimate ($\hat{\omega}_m$) and the rotor position tracking signal ($\epsilon$).

8 Claims, 3 Drawing Sheets

METHOD IN SALIENT-POLE PERMANENT MAGNET SYNCHRONOUS MACHINE

BACKGROUND OF THE INVENTION

The present invention relates to a method in connection with a salient-pole permanent magnet synchronous machine in accordance with the preamble of claim 1.

For reliable operation a plurality of motor control systems require accurate information on a position angle and angular speed of a rotor. In a typical implementation the position angle and the angular speed of the rotor are determined using a mechanical sensor coupled on a motor shaft. This sensor produces information, for instance, on the rotor position and from a change in the position it is further possible to calculate the angular speed of the rotor. However, the sensor coupled to the shaft is a mechanical component liable to faults, which increases the price of a motor drive considerably. In addition, as the motor drive control is based on information obtained from the sensor, sensor breakage inevitably causes downtime in said motor drive.

There are also currently used a variety of methods for controlling the motor without direct feedback from the position or speed of the rotor. The most common ways in connection with the permanent magnet synchronous machine are based on using various flux observers. The operation of the flux observer is based on a voltage model on a synchronous machine, the model being based on the voltage equation of the machine. The initial values required by the voltage equation are inductances and resistances of the machine.

The voltage models produce an accurate estimate on the angular speed of the rotor at its higher values. However, the voltage models have a drawback that at near-zero speed the estimate obtained by the voltage model becomes inaccurate, due to possibly erroneous parameters and measurement inaccuracies together with a low back EMF produced by the machine.

One manner to estimate a rotor position angle in a motion sensorless synchronous machine is based on utilizing signal injection methods. In signal injection an extra signal deviating from the fundamental frequency is injected to the motor either in voltage or in current form. This signal provides in the machine an injection frequency response, from which is obtained by demodulation a position tracking signal that can be used for determining the position of the rotor. Signal injection methods enable operation at low speeds down to zero speed, but the obtained dynamic behaviour is poor, however.

BRIEF DESCRIPTION OF THE INVENTION

The object of the invention is to provide a method, which avoids the above drawbacks and enables the determination of the angular speed and the position angle of a permanent magnet synchronous machine in a reliable manner on a wide operating range. This is achieved with a method that is characterized by what is stated in the characterizing part of the independent claim. The preferred embodiments of the invention are disclosed in the dependent claims.

The invention is based on the idea that the angular speed, calculated by means of a voltage model, of the rotor of a synchronous machine is corrected with a tracking signal produced by a signal injection method so as to provide a reliable angular speed estimate.

The estimates of a position angle and an angular speed achieved by the method of the invention are accurate on a wide angular speed range, in practice, from zero speed up to the maximal speed. The tracking signal produced by the injection method corrects the position angle at low speeds even though the parameters of the synchronous machine were erroneous in the voltage model. Likewise, the use of the method of the invention also considerably reduces the effect of inaccuracies in calculation and measurement on the estimates of the position angle and the angular speed.

BRIEF DESCRIPTION OF THE DRAWINGS

In the following the invention will be described in greater detail in connection with preferred embodiments, with reference to the attached drawings, wherein.

DETAILED DESCRIPTION OF THE INVENTION

Figure 1:
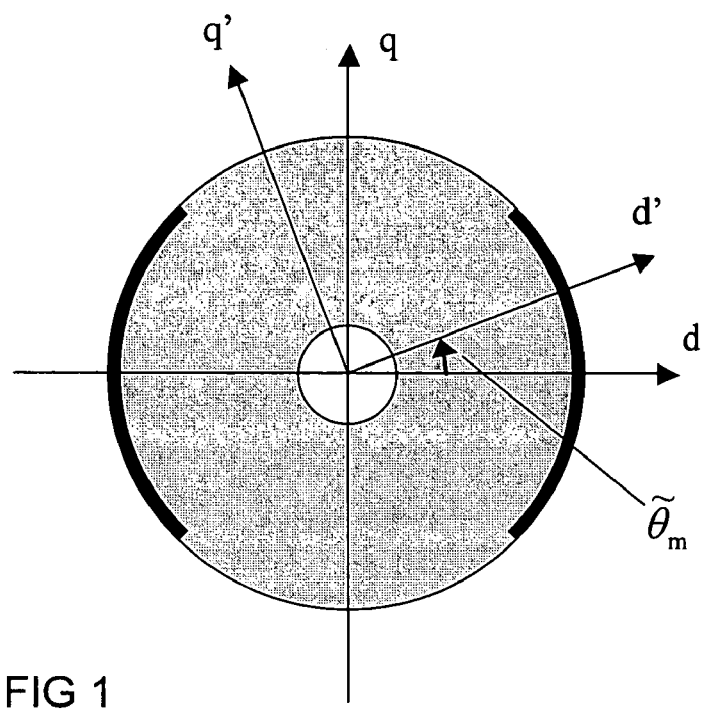
FIG. 1 is a simplified cross section of a salient pole rotor.

In the following, there is first described in detail a voltage model known per se, then signal injection known per se and finally a combination of these two, which constitutes a method of the invention.

Voltage Model

As mentioned above, in a flux observer based on a voltage model the flux and the speed are estimated from a stator voltage and a measured stator current. The voltage model is based on a motor voltage equation, which in connection with a solid rotor synchronous machine is expressed as $$\underline{u}_s^s = R_s \underline{i}_s^s + L_s \frac{d}{dt}\underline{i}_s^s + \frac{d}{dt}\underline{\psi}_{pm}^s \qquad (1)$$

where $\underline{u}_s^s$ is stator voltage in stator coordinates, is $\underline{i}_s^s$ a stator current, $L_s$ is stator inductance, $R_s$ is stator resistance and $\underline{\psi}_{pm}^s$ is a permanent magnet flux vector in stator coordinates. A time derivative estimate of the permanent magnet flux, i.e. a time derivative calculated from the estimated quantities, in the stator coordinates, is written as $$\underline{\hat{e}}_f^s = \frac{d}{dt}\underline{\hat{\psi}}_{pm}^s \qquad (2)$$

where a circumflex above a quantity denotes an estimate of the quantity. The time derivative estimate of the permanent magnet flux in the stator coordinates is an estimated back electromotive force (EMF) of the rotor. From the voltage equation (1) is obtained the equation for a back EMF estimate $$\underline{\hat{e}}_f^s = \underline{u}_s^s - \hat{R}_s \underline{i}_s^s - \hat{L}_s \frac{d}{dt}\underline{i}_s^s. \qquad (3)$$

In the voltage model the estimate of the permanent magnet flux in the stator coordinates is, at its simplest, just a time integral of the back EMF estimate $$\hat{\psi}_{pm}^s = \int \hat{e}_f^s dt. \qquad (4)$$

Let us translate the voltage equation (1) to rotor coordinates to obtain $$\underline{u}_s = R_s \underline{i}_s + L_s \frac{d}{dt} \underline{i}_s + j\omega_m L_s \underline{i}_s + \left( \frac{d}{dt} \psi_{pm} + j\omega_m \psi_{pm} \right) \qquad (5)$$

where $\underline{u}_s$ is stator voltage in rotor coordinates, $\underline{i}_s$ is a stator current in rotor coordinates, $\omega_m$ is the electrical angular speed of the rotor and $\psi_{pm}$ is the amplitude of the permanent magnet flux. In the model created on a permanent magnet synchronous machine, on which model the voltage model is based, the permanent magnet flux does not actually change. Because the voltage model is based on the estimation of the back EMF, an estimate is calculated for a time derivative of the permanent magnet flux and thereby a dynamic value of the permanent magnet flux, which value is further used for calculating a speed estimate. The estimate of the back EMF in the rotor coordinates is written as $$\hat{e}_f = \frac{d}{dt} \hat{\psi}_{pm} + j\hat{\omega}_m \hat{\psi}_{pm}. \qquad (6)$$

Solved from the voltage equation (5) in the rotor coordinates the back EMF estimate is $$\hat{e}_f = \underline{u}_s - \hat{R}_s \underline{i}_s - \hat{L}_s \frac{d}{dt} \underline{i}_s - j\hat{\omega}_m \hat{L}_s \underline{i}_s. \qquad (7)$$

In the case of a salient pole synchronous machine an estimate of stator inductance must be replaced by d- and q-axial inductance estimates $\hat{L}_d$ and $\hat{L}_q$. By dividing the complex back EMF estimate (7) into components and by replacing the stator inductance are obtained the terms $$\hat{e}_d = u_d - \hat{R}_s i_d - \hat{L}_d \frac{d}{dt} i_d + \hat{\omega}_m \hat{L}_q i_q \qquad (8)$$

$$\hat{e}_q = u_q - \hat{R}_s i_q - \hat{L}_q \frac{d}{dt} i_q - \hat{\omega}_m \hat{L}_d i_d. \qquad (9)$$

When the back EMF estimate expression (6) is divided into components and the components are combined with expressions (8) and (9), it will be possible to calculate estimates for the flux and the electrical angular speed by formulas $$\hat{\psi}_{pm} = \int \hat{e}_d dt \qquad (10)$$

$$\hat{\omega}_m = \frac{\hat{e}_q}{\hat{\psi}_{pm}}. \qquad (11)$$

The voltage model does not require the electrical angular speed of the rotor for flux estimation, so the method is sensorless. The motor parameters necessary for estimation include estimates for stator resistance $\hat{R}_s$ and in the case of the salient pole machine estimates for inductances $\hat{L}_d$ and $\hat{L}_q$.

The voltage model is based on an open loop integration. This is not good, however, because if the quantity to be integrated has a mean, as generally is the case with erroneous parameters, for instance, the integral is not stable and continuously increases its value. Thus, the integral needs to be compensated or replaced, for instance, by low-pass filtering.

The voltage model can be modified in a variety of ways. One modification is described in the publication "Vector control of induction motor without shaft encoder", *IEEE Transactions on Industry Applications*, Vol, 28, No. 1, January/February 1992, pp. 157-164, by T. Ohtani, N. Takada, K. Tanaka. This voltage model modification that has been found to work in connection with the method of the invention is represented, translated to rotor coordinates, in the equation $$\frac{d}{dt}\hat{\psi}_{pm} + j\hat{\omega}_m \hat{\psi}_{pm} = \hat{e}_d + j\hat{e}_q + \lambda(\hat{\psi}_{pm,0} - \hat{\psi}_{pm}) \qquad (12)$$

where $\hat{\psi}_{pm,0}$ is an estimate of the static value of the permanent magnet flux, which estimate can be solved, for instance, by an identification run, and $\lambda$ is a compensation coefficient. In the equation the compensation coefficient $\lambda$ corresponds to the bandwidth of the low-pass filter. When real and imaginary parts are separated from the equation (12), the estimates for the permanent magnet flux and the electrical angular speed of the rotor can be solved by equations $$\frac{d}{dt}\hat{\psi}_{pm} = \hat{e}_d + \lambda(\hat{\psi}_{pm,0} - \hat{\psi}_{pm}) \qquad (13)$$

$$\hat{\omega}_m = \frac{\hat{e}_q}{\hat{\psi}_{pm}}. \qquad (14)$$

As stated above, the flux observer based on the voltage model works well at high speeds, because the back EMF induced by the motor is high and the effect of erroneous parameters, if any, will remain small. At low speeds the voltage model will not work alone in the case of erroneous parameters.

Signal Injection Methods

Anisotropy of the rotor of a permanent magnet machine can be detected from variables measured on the rotor. Injecting a signal that deviates from the fundamental wave into stator connectors produces an injection frequency response that includes information on the rotor position. The rotor position can thus be concluded from the injection frequency portion of the measured current or voltage. This method is known as signal injection. The excitation fed into the motor can be either voltage or current, whereby the response will be obtained from the measured current or voltage, respectively. In this method to be described in greater detail the signal injection method is a high-frequency (typically 500 to 1000 Hz) signal injection using voltage excitation.

In the method described a high-frequency, oscillating voltage signal is applied to the d-axis of assumed rotor coordinates, whereby an injection frequency current can be detected on the q-axis of the assumed rotor coordinates when the position angle is erroneous. This method is described in greater detail in the publication by M. Corley and R. Lorenz in 1998: "Rotor position and velocity estimation for a salient-pole permanent magnet synchronous machine at standstill and high speeds", *IEEE Transactions on Industry Applications*, Vol. 34, No. 4, July/August 1998. FIG. 1 shows a cross section of the rotor and the axes of the synchronous coordinates, when an estimated position angle is erroneous. In the figure, $\tilde{\theta}_m = \hat{\theta}_m - \theta_m$ is a rotor position angle error and the axes d' and q' are the axes of the estimated rotor coordinates.

The voltage signal to be used in the signal injection is given by $$u_c = \hat{u}_c \cos(\omega_c t) \qquad (15)$$

where $\hat{u}_c$ is the amplitude of injection frequency voltage and $\omega_c$ is the angular frequency. The voltage produces a current-form response in the assumed rotor coordinates $$i_{cq'} = \frac{\hat{u}_c}{\omega_c} \frac{L_q - L_d}{2 L_q L_d} \sin(2\theta_m - 2\hat{\theta}_m) \sin(\omega_c t) \qquad (16)$$

where $L_d$ is stator inductance in the direction of the direct axis and $L_q$ is stator inductance in the direction of the quadrature axis. The assumed q-axial current is high-pass filtered or band-pass filtered to remove a strong fundamental component, whereafter it is demodulated by multiplying by $\sin(\omega_c t)$. When the fundamental component of the signal is ignored, the demodulated signal has the following form $$i_\varepsilon = \frac{\hat{u}_c}{\omega_c} \frac{L_q - L_d}{2 L_q L_d} \sin(2\theta_m - 2\hat{\theta}_m) [1 - \cos(2\omega_c t)]/2. \qquad (17)$$

The signal thus oscillates at double injection frequency, and therefore it should be low-pass filtered prior to using it for estimating a position error. The mean of the demodulated signal is the position tracking signal $$\varepsilon = \frac{\hat{u}_c}{\omega_c} \frac{L_q - L_d}{4 L_q L_d} \sin(2\theta_m - 2\hat{\theta}_m). \qquad (18)$$

When the position angle error is small it can be assumed that the tracking signal is directly proportional to the position angle error in accordance with the expression $$\varepsilon \approx K_\varepsilon [2(\theta_m - \hat{\theta}_m)] \qquad (19)$$

where $$K_\varepsilon = \frac{\hat{u}_c}{\omega_c} \frac{L_q - L_d}{4 L_q L_d} \qquad (20)$$

is signal injection amplification in the case of the oscillating signal injection.

Figure 2:
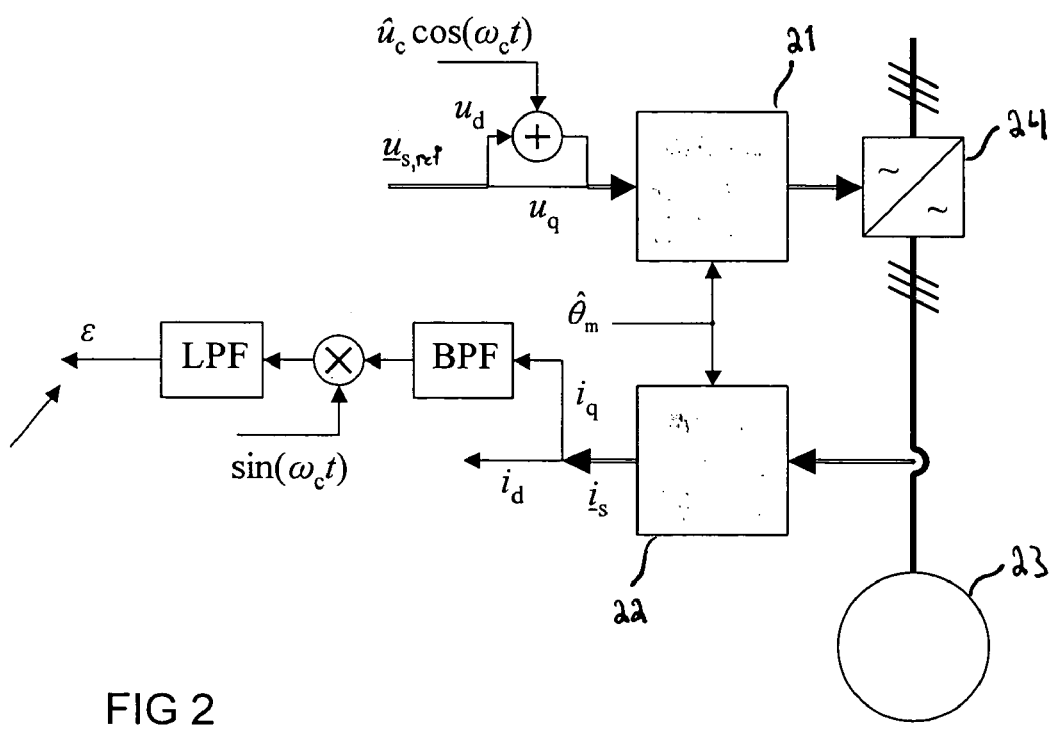
FIG. 2 is a block diagram of oscillating signal injection.

FIG. 2 shows a schematic block diagram of the oscillating signal injection. This block diagram shows a stator voltage reference $\underline{u}_{s,ref}$ to be applied to a frequency converter, to the d component of which is added a signal $\hat{u}_c \cos(\omega_c t)$. The machine 23 is controlled with a frequency converter 24 to implement the voltage reference and the stator current of the machine is determined. It is shown in FIG. 2 how demodulation is implemented by multiplying the stator current q component portion, filtered with a band-pass filter BPF, by $\sin(\omega_c t)$ and further by low-pass filtering the product obtained with a low-pass filter LPF. FIG. 2 also shows coordinate translation blocks 21, 22, by which the voltage reference is translated from the assumed rotor coordinates to assumed stator coordinates and correspondingly the measured current from the stator coordinates to the assumed rotor coordinates. At the low-pass filter output there will be a position tracking signal $\varepsilon$ that can be used for the determination of the angular speed and position angle of the rotor.

Estimates of the rotor speed and position can be produced from the error signal obtained by the signal injection by means of a phase-locked loop as described in the publication by L. Harnefors, H. Nee in 2000: "A general algorithm for speed and position estimation of ac motors", *IEEE Transactions on Industrial Electronics*, Vol. 47, No. 1, February 2000, pp.77–83. From the difference obtained by the signal injection there is formed an estimated electrical angular speed of the rotor by integration. An estimated position angle is obtained by integrating the estimated electrical angular speed, to which is added the difference multiplied by the coefficient portion of the controller. The method is not based on the mechanical model of the motor.

Figure 3:
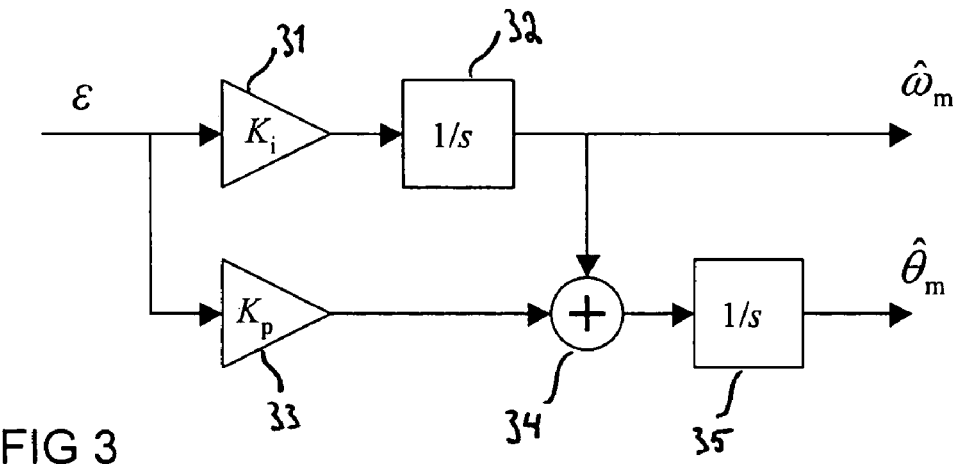
FIG. 3 is a block diagram of a prior art manner to estimate the angular speed and the position angle of a rotor on the basis of an error signal.

A block diagram of a controller forming speed and position estimates is shown in FIG. 3. The input of this controller is the position tracking signal $\varepsilon$. When the position is erroneous, i.e. when the tracking signal deviates from zero, an amplifier 31 amplifies the signal with Ki, whereafter the amplified signal is integrated with an integrator 32. Simultaneously the position tracking signal $\varepsilon$ is amplified with an amplifier 33, and the signal multiplied by $K_p$ is summed with a summing means 34 to the output signal of the integrator 32. The summed signal is further integrated with an integrator 35, whereby there is obtained an estimate on the rotor position angle $\hat{\theta}_m$. Correspondingly, the output of the integrator 32 forms an angular speed estimate $\hat{\omega}_m$. Thus, the controller operates such that the position angle estimate $\hat{\theta}_m$ obtained from the output is to be corrected to correspond to the actual position angle, whereby the position tracking signal $\varepsilon$ is zeroed.

Combination of Voltage Model and Signal Injection

Figure 4:
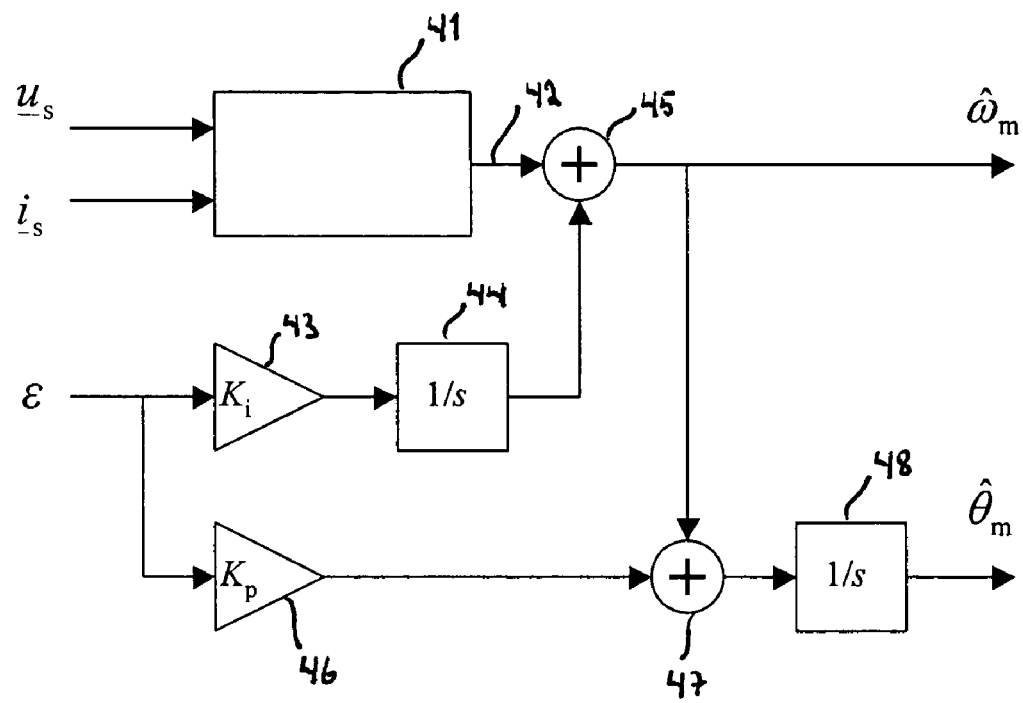
FIG. 4 shows a combination of a voltage model and signal injection in accordance with the invention.

FIG. 4 shows a combination of a voltage model and signal injection, which implements the method of the invention. In the method of the invention there is created a voltage model 41 on a permanent magnet synchronous machine. This voltage model is advantageously a modified voltage model similar to those presented in formulas (13) and (14). The voltage model may, however, be a standard voltage model presented in formulas (10) and (11), or any modification of machine flux equations that will provide a desired final result.

The invention further comprises forming a voltage reference for a permanent magnet machine stator, determining stator currents of the permanent magnet synchronous machine and calculating a rotor angular speed from the voltage reference and the stator currents by using the voltage model. The formed voltage reference corresponds to the voltage of the machine stator poles so there will be no need to measure the stator voltage directly. In the voltage model it is possible, however, to use the measured voltage if need be. The method thus calculates the angular speed of the synchronous machine rotor on the basis of the above-described voltage model, which uses the stator voltage $\underline{u}_s$ and the stator current $\underline{i}_s$ as initial values. These variables are given in the assumed rotor coordinates, i.e. in the coordinates whose angular speed in relation to the stator is determined by the method in accordance with the invention.

In accordance with the invention signal injection is used for forming a rotor position tracking signal $\epsilon$ of the permanent magnet synchronous machine, the formation of which signal is described above with reference to FIG. 2. FIG. 4 shows how the position tracking signal $\epsilon$, the stator voltage $\underline{u}_s$ and the stator current $\underline{i}_s$ are applied as inputs to the block diagram determining the angular speed.

The invention further comprises forming a rotor angular speed estimate $\hat{\omega}_m$ from the rotor angular speed 42, calculated by the voltage model 41, and the rotor position tracking signal $\epsilon$ and forming a rotor position angle estimate $\hat{\theta}_m$ from the formed rotor angular speed estimate $\hat{\omega}_m$ and the rotor position tracking signal $\epsilon$.

In accordance with a preferred embodiment of the invention the rotor angular speed estimate is formed from the rotor angular speed 42 and the rotor position tracking signal $\epsilon$ with a control circuit such that the tracking signal $\epsilon$ is amplified with an amplifier 43 by multiplying it by a coefficient $K_i$ and by integrating by an integrator 44. The integrated signal is summed with a summing means 45 to the rotor angular speed 42 from the voltage model to obtain a rotor angular speed estimate $\hat{\omega}_m$.

Further, in accordance with a preferred embodiment of the invention a rotor position angle estimate $\hat{\theta}_m$ is formed by integrating the sum of the formed angular speed estimate $\hat{\omega}_m$ and the position tracking signal $\epsilon$ multiplied with the amplifier 46.

In principle the block diagram of FIG. 4 operates such that to the angular speed obtained from the voltage model is summed integral of a difference produced by signal injection. At the same time to this sum, i.e. the angular speed estimate $\hat{\omega}_m$, is added with the summing means 47 the position tracking signal $\epsilon$ multiplied by $K_p$. The output of the summing means 47 is further integrated with the integrator 48 to obtain a position angle estimate $\hat{\theta}_m$.

The rotor position tracking signal is zero if the rotor position angle estimate $\hat{\theta}_m$ is precisely equal to the actual rotor position. If this is a steady state, i.e. the estimate remains correct, the angular speed estimate is also equal to the actual value. The block diagram of FIG. 4 forms a control loop, in which a change in the actual speed in relation to the estimate and a change in the actual angle in relation to the estimate causes a value change in the estimates and finally the estimates become equal to the actual values. In other words, the position tracking signal always approaches as closely as possible to zero. This takes place in such a manner that the position tracking signal is summed to the value obtainable from the voltage model and corrects the value closer to the actual value.

Because the tracking signal contains high-frequency noise and a strong injection frequency component, the signal must be low-pass filtered. In order to make a low-pass filter and a controller connected to the voltage model operate correctly, the transfer function of the closed loop of the position estimate should be solved. When the low-pass filter of the first order is taken into account, the transfer function of the closed loop is obtained by $$\frac{\hat{\theta}_m(s)}{\theta_m(s)} = \frac{2K_\varepsilon \omega_{lp} K_p s + 2K_\varepsilon \omega_{lp} K_i}{s^3 + \omega_{lp} s^2 + 2K_\varepsilon \omega_{lp} K_p s + 2K_\varepsilon \omega_{lp} K_i} \quad (21)$$

where $\omega_{lp}$ is a limit frequency of the low-pass filter. When the poles of the third degree system are placed in the left half-plane of a complex plane, evenly spaced on an arc of a circle with $\alpha_{inj}$ radius, the nominator polynomial is of the form $$s^3 + 2\alpha_{inj} s^2 + 2\alpha_{inj}^2 s + \alpha_{inj}^3 \quad (22)$$

where $\alpha_{inj}$ is thus the tuning frequency of the system. When it is desired that the nominator polynomial of the closed loop transfer function (21) corresponds to the expression (22), the tuning parameters of the controller and the limit frequency of the low-pass filter of the first degree will be solved by expressions $$\omega_{lp} = 2\alpha_{inj} \quad (23)$$

$$K_p = \frac{\alpha_{inj}}{2K_\varepsilon} \quad (24)$$

$$K_i = \frac{\alpha_{inj}^2}{4K_\varepsilon} \quad (25)$$

where $\alpha_{inj}$ as the only variable is the tuning frequency proportional to the bandwidth of the phase-locked loop. On solving the parameters the effect of the electrical angular speed estimate obtained with the voltage model is ignored. When oscillating signal injection is combined to the voltage model the entire control system suitable for controlling the motor is in accordance with FIG. 5.

Figure 5:
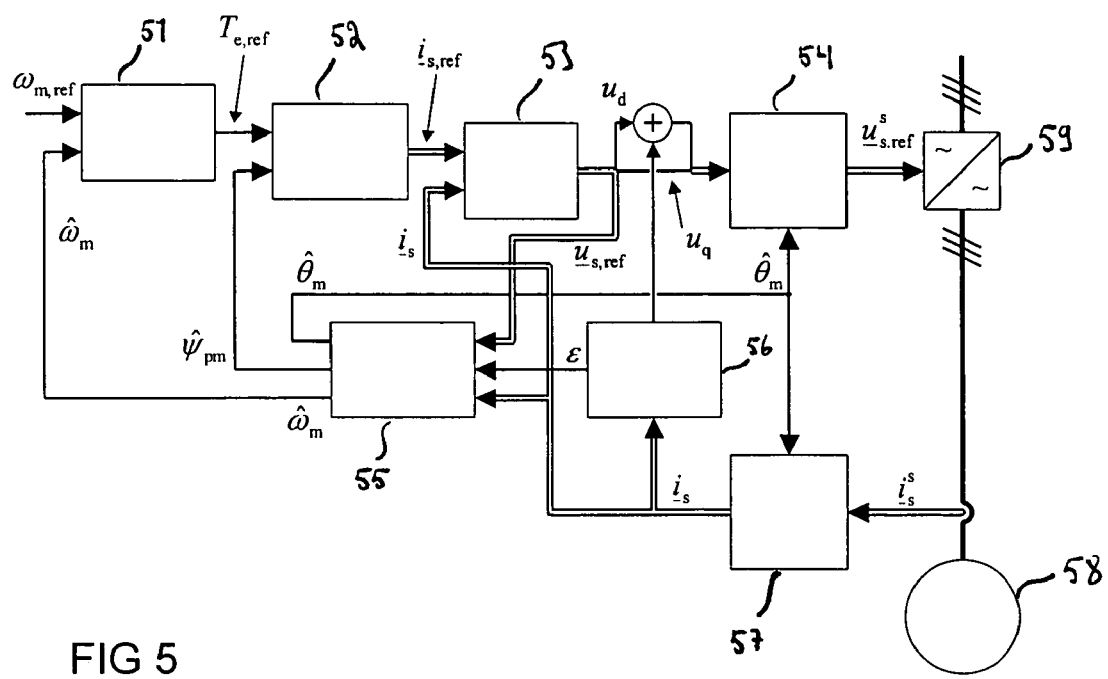
FIG. 5 shows a control system arranged to control a permanent magnet synchronous machine with the combination of the voltage model and the signal injection in accordance with the invention.

In FIG. 5, the speed controller 51 is given a speed reference $\omega_{m,ref}$, which compares the reference with the angular speed estimate $\hat{\omega}_m$ determined in accordance with the method. In the embodiment of FIG. 5 from the speed controller output is obtained a torque reference $T_{e,ref}$ which is applied to a current reference calculating block 52. The current reference $\underline{i}_{s,ref}$ is calculated on the basis of said torque reference and the flux estimate $\hat{\psi}$pm determined by the flux observer 55 in a manner known per se. The current reference is further applied to the current controller 53, whose other input is the determined stator current actual value $\underline{i}_s$. In the embodiment of FIG. 5 the current controller output is a stator voltage reference $u_{s,ref}$ which is used both for controlling the motor 58 with a frequency converter 59 and for input of the flux observer 55 as described above. Prior to controlling the frequency converter with the stator voltage reference it is divided into d and q components for implementing signal injection. The signal injection block 56 adds to the d component of the stator voltage reference a high-frequency signal that is further demodulated from the determined stator current.

The control system of FIG. 5 works in assumed rotor coordinates, so both the stator voltage reference and the measured stator current should be translated between the coordinates using coordinate translation blocks 54 and 57. For this translation there are used translation methods well known in the field and information obtained from the flux observer on the estimated rotor position angle. In FIG. 5 the flux observer 55 includes a control circuit of FIG. 4 that implements the method of the invention.

It is obvious to a person skilled in the art that as technology advances the basic idea of the invention can be implemented in a variety of ways. The invention and the embodiments thereof are thus not restricted to the above examples, but they may vary within the scope of the claims.

The invention claimed is:

1. A method for determining the speed and position of a rotor of a salient-pole permanent magnet synchronous machine, the method comprising:
creating a voltage model on a permanent magnet synchronous machine;
forming a voltage reference for a stator of the permanent magnet synchronous machine;
determining stator currents of the permanent magnet synchronous machine;
calculating a rotor angular speed from the voltage reference and the stator currents using the voltage model, wherein the method further comprises the steps of:
forming with signal injection a position tracking signal of the rotor of the permanent magnet synchronous machine;
forming an rotor angular speed estimate simultaneously from the calculated rotor angular speed and the rotor position tracking signal;
forming a rotor position angle estimate simultaneously from the formed rotor angular speed estimate and the rotor position tracking signal.

2. A method as claimed in claim 1, wherein the formation of the rotor angular speed estimate comprises the step of, amplifying the position tracking signal.

3. A method as claimed in claim 2, wherein the formation of the rotor position angle estimate comprises the steps of:
summing the amplified position tracking signal to the angular speed estimate and
integrating the obtained sum.

4. A method as claimed in claim 1, wherein the signal injection is implemented in the d-component of the voltage reference by adding thereto an oscillating signal, whereby the position tracking signal is demodulated from the q-component of the determined stator current.

5. A method for determining the speed and position of a rotor of a salient-pole permanent magnet synchronous machine, the method comprising:
creating a predetermined voltage model on a permanent magnet synchronous machine;
forming a voltage reference for a stator of the permanent magnet synchronous machine;
determining stator currents of the permanent magnet synchronous machine;
calculating a rotor angular speed from the voltage reference and the stator currents using the voltage model, wherein the method further comprises:
forming with signal injection a position tracking signal of the rotor of the permanent magnet synchronous machine;
forming an rotor angular speed estimate from the calculated rotor angular speed and the rotor position tracking signal;
forming a rotor position angle estimate from the formed rotor angular speed estimate and the rotor position tracking signal;
amplifying the position tracking signal;
summing the amplified position tracking signal to the angular speed estimate; and
integrating the obtained sum.

6. A method as claimed in claim 5, wherein the signal injection is implemented in the d-component of the voltage reference by adding thereto an oscillating signal, whereby the position tracking signal is demodulated from the q-component of the determined stator current.

7. A method for determining the speed and position of a rotor of a salient-pole permanent magnet synchronous machine, the method comprising:
creating a predetermined voltage model on a permanent magnet synchronous machine;
forming a voltage reference for a stator of the permanent magnet synchronous machine;
determining stator currents of the permanent magnet synchronous machine;
calculating a rotor angular speed from the voltage reference and the stator currents using the voltage model, wherein the method further comprises:
forming with signal injection a position tracking signal of the rotor of the permanent magnet synchronous machine;
forming an rotor angular speed estimate from the calculated rotor angular speed and the rotor position tracking signal;
forming a rotor position angle estimate from the formed rotor angular speed estimate and the rotor position tracking signal; and;
modifying the predetermined voltage model.

8. A method as claimed in claim 7, wherein the signal injection is implemented in the d-component of the voltage reference by adding thereto an oscillating signal, whereby the position tracking signal is demodulated from the q-component of the determined stator current.

* * * * *